(12) United States Patent
Fujisawa et al.

(10) Patent No.: US 8,738,447 B2
(45) Date of Patent: May 27, 2014

(54) BANNER ADVERTISEMENT TRANSFER SERVER AND BANNER ADVERTISEMENT TRANSFER PROGRAM

(75) Inventors: Tomonori Fujisawa, Tokyo (JP); Shouji Satou, Kuroiso (JM)

(73) Assignee: Kabushiki Kaisha Eighting, Tokyo (JP)

( * ) Notice: Subject to any disclaimer, the term of this patent is extended or adjusted under 35 U.S.C. 154(b) by 2313 days.

(21) Appl. No.: 10/484,466

(22) PCT Filed: Jul. 18, 2002

(86) PCT No.: PCT/JP02/07293
§ 371 (c)(1),
(2), (4) Date: Jan. 22, 2004

(87) PCT Pub. No.: WO03/010697
PCT Pub. Date: Feb. 6, 2003

(65) Prior Publication Data
US 2004/0215513 A1    Oct. 28, 2004

(30) Foreign Application Priority Data
Jul. 25, 2001  (JP) .................................. 2001-224089

(51) Int. Cl.
G06Q 30/00    (2012.01)
G06Q 30/02    (2012.01)

(52) U.S. Cl.
CPC ........ G06Q 30/0277 (2013.01); G06Q 30/0246 (2013.01)
USPC ..................................... 705/14.73; 705/14.45

(58) Field of Classification Search
USPC .......................................................... 705/14
See application file for complete search history.

(56) References Cited

U.S. PATENT DOCUMENTS

| | | | | |
|---|---|---|---|---|
| 5,315,504 A | * | 5/1994 | Lemble | 700/90 |
| 5,948,061 A | * | 9/1999 | Merriman et al. | 709/219 |
| 6,385,590 B1 | * | 5/2002 | Levine | 705/10 |
| 7,219,301 B2 | * | 5/2007 | Barrie et al. | 715/751 |
| 2001/0047413 A1 | * | 11/2001 | Landau et al. | 709/225 |
| 2002/0133395 A1 | * | 9/2002 | Hughes et al. | 705/11 |

FOREIGN PATENT DOCUMENTS

| | | |
|---|---|---|
| JP | 2000-194636 | 7/2000 |
| JP | 2001-43241 | 2/2001 |

OTHER PUBLICATIONS

Smartclicks: a series of screenshots of the www.smartclicks.com website from April of 1999, obtained by the wayback machine (www.archive.org).*

* cited by examiner

Primary Examiner — Nathan C Uber
(74) Attorney, Agent, or Firm — Manabu Kanesaka

(57) ABSTRACT

A banner advertisement transfer server for transferring a banner advertisement to a plurality of sponsors which form members for the banner advertisement on a web and are connected to the server through a network includes a device for analyzing a click signal for the banner advertisement, a device for counting the click signal by each of the members registered in the server, and a device for deciding a transfer number of the banner advertisement for each of the members in response to a total number of the click signals. The transfer number of the banner advertisement for one member is calculated based on a number of the click signals by the one member for the banner advertisement of other members.

5 Claims, 5 Drawing Sheets

BANNER ADVERTISEMENT TRANSFER SERVER AND BANNER ADVERTISEMENT TRANSFER PROGRAM

BACKGROUND OF THE INVENTION AND RELATED ART STATEMENT

The present invention relates to a server for transferring a banner advertisement to a plurality of clients linked via a network and a banner advertisement transfer program.

In association with rapid popularization of a computer network represented by the Internet, there is growing interest in the techniques for placing advertisements on the network. As the advertising technique as described above, there has been known a banner advertisement having an entry address for a sponsor's web site and comprising graphic information concerning the sponsor's name or simple copies for the sponsor's products. When a user interested in the banner advertisement clicks thereon, the user can enter the sponsor's web site, where detailed advertisement information is provided to the user. However, a volume of information which can be provided with a banner advertisement is limited by the banner's size, and a frequency of clicking on the banner advertisement by users is generally limited, so that the banner advertisements have has limited popularity.

Japanese Patent Laid-Open Publication No. 2000-194636 discloses, as a device for raising the clicking frequency on a banner advertisement, an invention relating to a method of providing information with a banner advertisement attached thereto wherein whether the information is provided or not is decided according to a result of operations of the banner advertisement by users. In this invention, whether the information is provided or not may be decided based on the frequency management system in which a prespecified point is increased each time an operation of the banner advertisement is detected; the point is reduced according to a period of time when the information is provided to the user; and provision of the information is allowed only when the point is effective (integral value).

The invention relates to a method of providing information with a banner advertisement attached thereto, and with this invention, service or information can not be provided unless a user clicks on a banner advertisement, so that, although it may be useful to some extent to specific viewers who appreciate the service or information, this system is worthless to other users, and can not provide any motivation for raising the clicking frequency.

SUMMARY OF THE INVENTION

Generally, banner advertisements are passively or impulsively accessed, but are extremely effective for raising the access frequency to web sites, and it can be considered that the banner advertisements would give substantially large influences the IT (information technology) oriented society in the future. The present inventors considered that the causes for unpopularity of banner advertisements consist in lack of acceptance (or expectancy) for banner advertisements and also in lack of incentive for clicking on the banner advertisements, and have made this invention through strenuous efforts to solve the problems. Therefore, the present invention provides a banner advertisement transfer server and a banner advertisement transfer program each enabling smooth increase in clicks on the banner advertisements.

The present invention provides a server for transferring banner advertisements to a plurality of clients or sponsors forming members for the banner advertisement on a web, said plurality of sponsors being linked to the server through a network, and the server comprises a means for analyzing a click signal for a banner advertisement, a means for counting the click signal by each of the members or clients registered in the server, and a means for deciding a number of the banner advertisement transfers for each of the members or clients in response to the count.

Preferably, the click signal analyzing means analyzes a clicked banner advertisement, a registered client or member having clicked on the banner advertisement, and a time of clicking.

A period of time having passed from a time counted when the registered client clicked on the banner advertisement previously is measured, and if a prespecified period of time had not passed yet, preferably the counting work is not executed.

The present invention provides a program for transferring a banner advertisement from a server to a plurality of clients linked via a network to the server, and the program works for activating a means for analyzing a click signal for a banner advertisement, a means for counting the signal signals for each of clients registered in the server, and a means for deciding a transfer amount of the banner advertisement relating to the registered client in response to the total count.

DETAILED DESCRIPTION OF THE PREFERRED EMBODIMENTS (1) Preconditions for the Present Invention At first the banner advertisement as used herein indicates an icon having an entry address for a web site of an advertisement sponsor and consisting of text or image information concerning the sponsor's name or a product or products provided by the sponsor.

Figure 1:
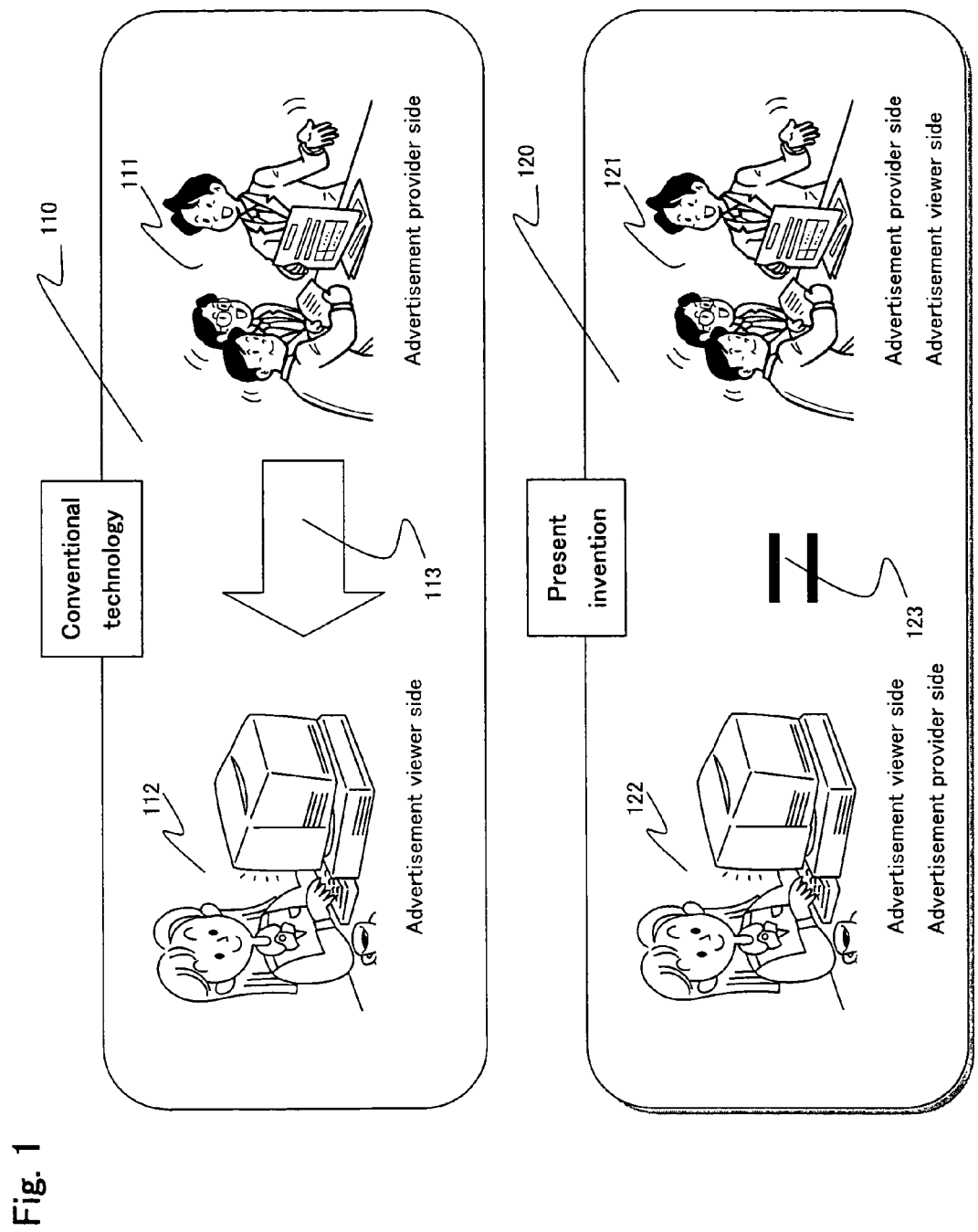
FIG. 1 is an explanatory view showing a relation between a sponsor of an advertisement and a viewer of the advertisement in the present invention in contrast to that in the conventional technology.

In the conventional concept for an advertisement, a advertisement sponsor side (111) and an advertisement viewer side (112) are clearly separated from each other conceptually as shown in a upper row (110) in FIG. 1, and in the one-way type of media as represented by a television or a radio, an information flow (113) from the sponsor side to the receiving side exists.

In the present invention, however, as shown in a lower row (120) in FIG. 1, the sponsor side (111) and the receiving side (112) have the equal positions (123) respectively, so that the advertisement sponsor side (111) stands at the position (121) where the sponsor provides an advertisement and at the same time receivers advertisements from other sponsors, and also the advertisement viewer side (112) stands at the position (122) where the viewer provides an advertisement and at the same time receives advertisements from other sponsors or viewers.

In the present invention, sponsors of advertisements each hoping to display a banner advertisement on the web are organized as members, and each of the members may receive banner advertisements from other members at a terminal (also described as a client hereinafter) connected to a network. Namely, the member stands at the positions (121, 122) where the member provides an advertisement and can receive advertisements as described above. The clients are connected to the banner advertisement transfer server according to the present invention via a network such as the Internet.

(2) Configuration of a Banner Advertisement Window

Figure 2:
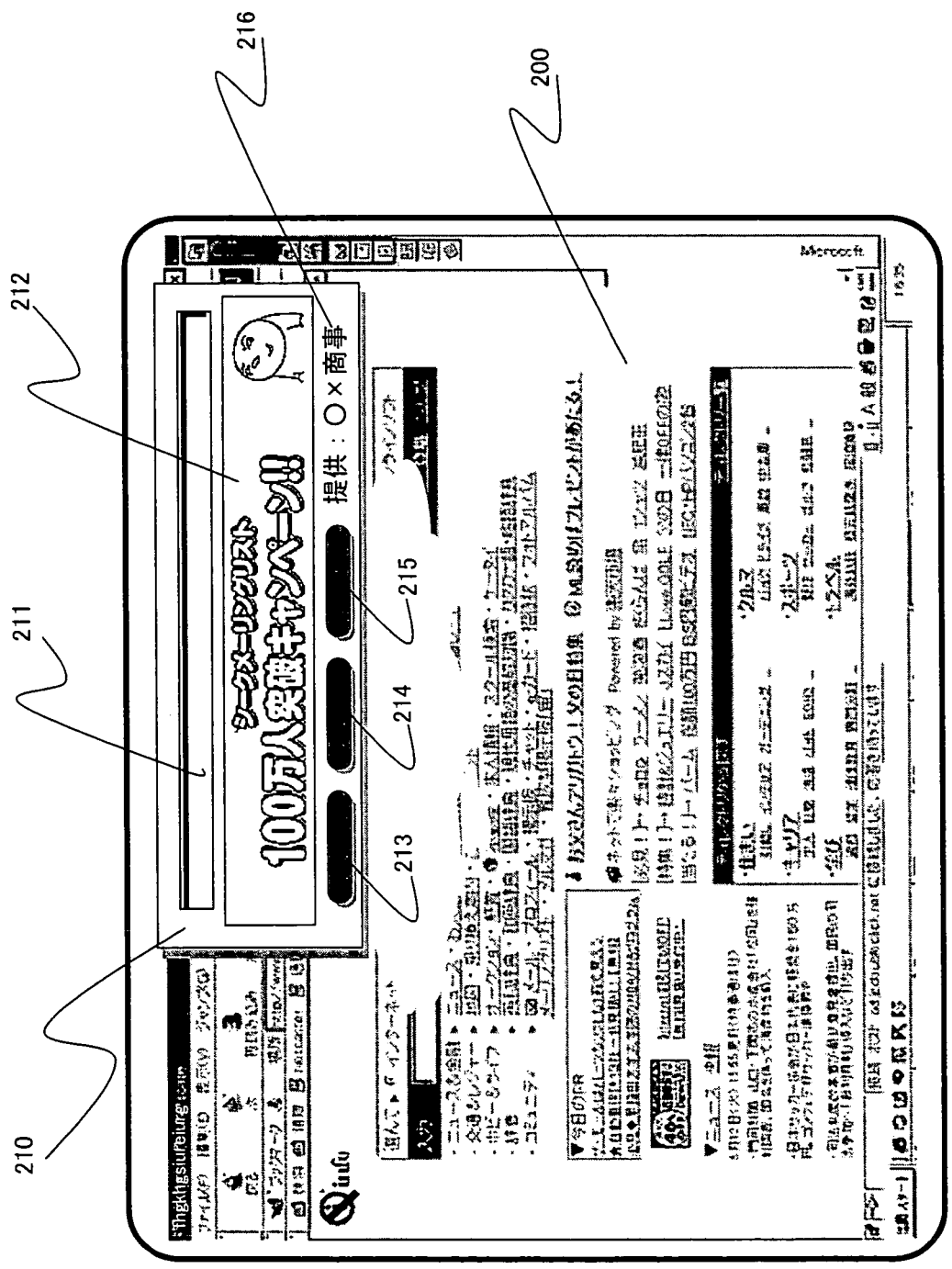
FIG. 2 is a monitor display screen as a window for displaying a banner advertisement in the present invention.

FIG. 2 shows a client monitor screen owned by a member, and a browser screen (200) is displayed as the background on the entire client monitor screen, and a window for displaying a banner advertisement there (described as a display plate (210) hereinafter) is displayed in the enlarged form for convenience of illustration at the top right corner. In FIG. 2, the display plate (210) has a rectangular form long from side to side, but the form is not limited to this one so long as the employed form is suited to display of an advertisement. The display plate (210) has a main advertisement display section (212) at the central portion, and a landscape message display section (211) may be provided at a position above the main advertisement display section (212).

Provided at positions below the main advertisement display section (212) are a message sending button (213) used for sending a message to other members and a message receiving button (214) for receiving a message from other members according to the necessity respectively. The message exchange function is a means for enhancing the advertising effect of the banner advertisement.

Further provided at a position below the main advertisement display section (212) are a click & access analysis data receiving button (215) and a sub-advertisement display section (216).

Figure 3:
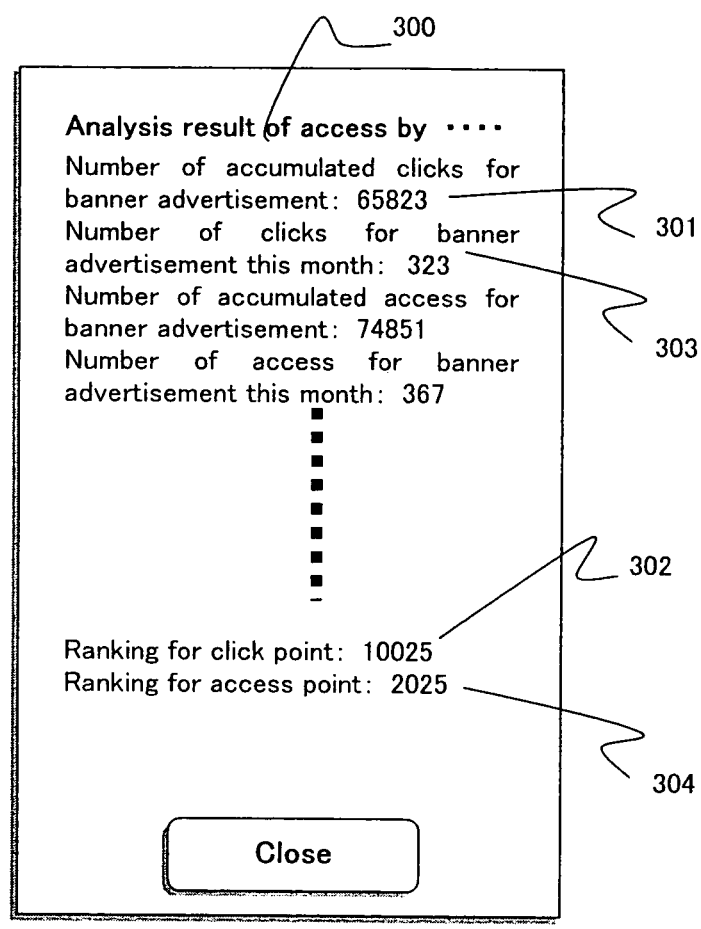
FIG. 3 is a screen displayed when a click & access analysis data button is pressed.

In the present invention, how many times a banner advertisement registered by other member a member has been clicked on, or how many times a banner advertisement registered by the member has been accessed by other members or by non-members can be known by pressing the analysis data button (215). Namely, as shown, for instance, in FIG. 3 showing a window (300) displayed by pressing a click & access analysis data receiving button, a result of analysis including such data as the accumulated number of times a registered banner advertisement has been clicked on (301), a ranking for the number of clicks or clicking number (302), the numbers of access to a banner advertisement registered by a member (303), and the ranking of the number of accesses (304) is displayed. Any known technique for analyzing the click or access data may be used, but a dedicated log file is required together with a password (ID data) transmitted from each client.

It is to be noted that the display plate (210) itself may be displayed by activating a known dedicated program, or may be displayed by a program for display on a browser.

(3) Actions of the Banner Advertisement Display Window

Request signals from clients are always monitored by a banner advertisement transfer server through a network to which the server is connected. When a client receives any signal transmitted from the banner advertisement transfer server in response to the request signal, a message signal is displayed on the message display section (211) and an advertisement signal is displayed on the main advertisement display section (212) respectively.

Displayed on the sub-advertisement display section (216) is an advertisement of an organization managing the banner advertisement transfer server. The sub-advertisement display section (216) is different from the main advertisement display section (212) in the point that the advertisements displayed thereon doe not change from time to time, but is similar to the main advertisement display section (212) in the point that, when the sub-advertisement display section (216) is clicked thereon, a prespecified page (URL) is displayed on the background browser screen (200).

Figure 4:
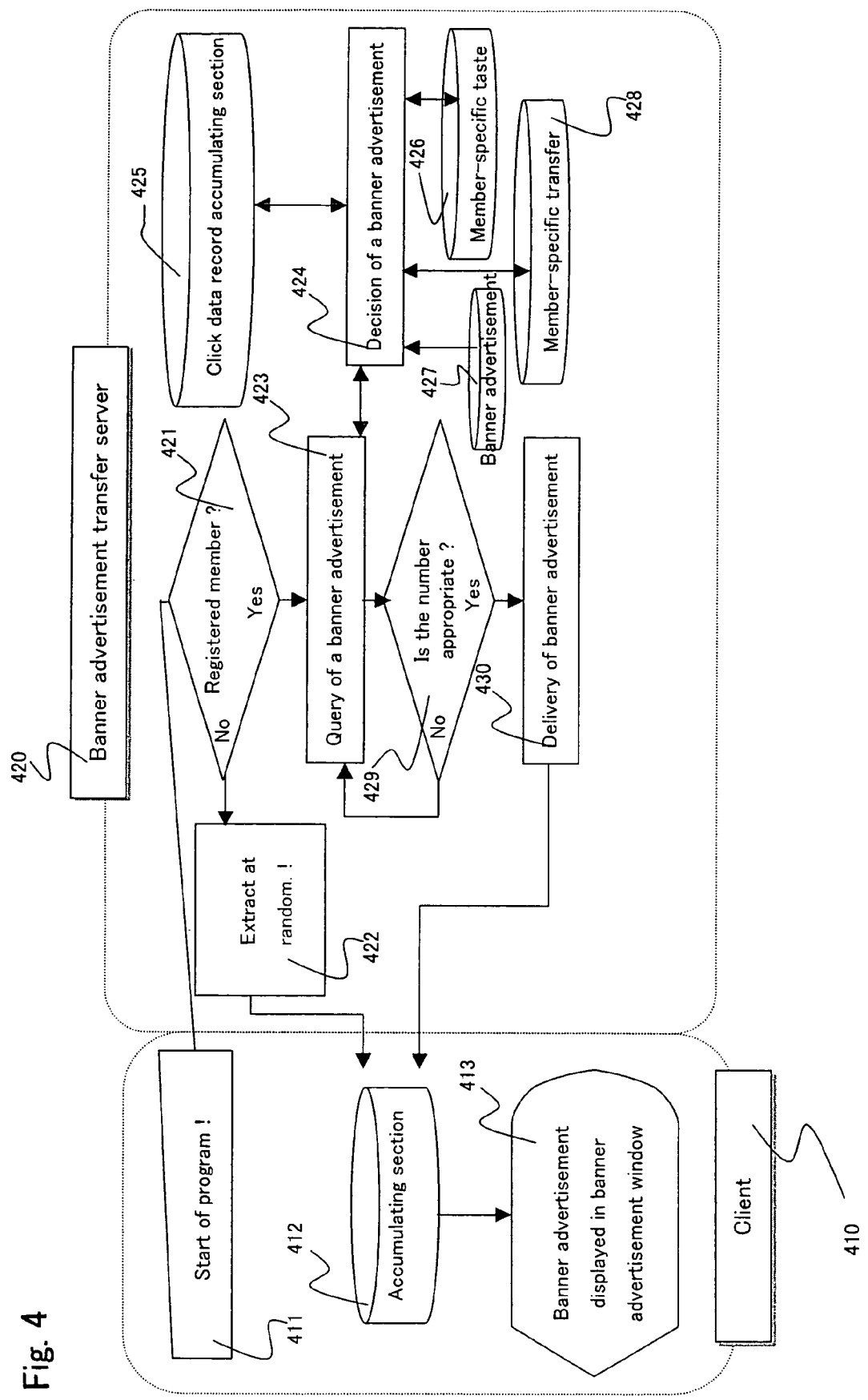
FIG. 4 is a flow chart for explaining the steps up to that in which the banner advertisement is displayed on the display plate.

(4) Detailed Description of the Banner Advertisement Transfer Server and a Program for the Same FIG. 4 is a flow chart illustrating the steps executed from a point of time when a client is activated by a member until a point of time when a banner advertisement is displayed in the main advertisement display section (212) of the display plate (210). In this figure, a client (410) is shown in the left side of the figure, and a banner advertisement transfer server (420) connected to the client through a network is shown in the right side thereof.

This program is activated (411) automatically in the client (410) or in response to a manual operation by a member, and logging-in the transfer server (420) is started upon an input of a password. In this step, the client (410) carries out an operating session for logging-in and at the same time transmits a signal for requesting a new banner advertisement. The transfer server (420) having received the signal determines (421) whether the member is registered or not by a password or other ID data. When it is determined in this step that the user is not a registered member, a previously selected banner advertisement is selected at random (422) and is transmitted to the client (410). On the other hand, when it is determined that the user is a registered member, an operation for querying a banner advertisement to be transferred to the member is started (423).

In the step of processing (424) for deciding a banner advertisement or banner advertisements to be transferred to the member, at first a query is sent to a discrete member's preference data accumulating section (426) in which the discrete member's preference data has been registered at the time of membership registration, a plurality of candidate advertisements are selected from the banner advertisement accumulating section (427) based on the information, and further the number of transfers (viz., transfer number) and the priority order associated with each advertisement are queried to a discrete member transfer number data accumulating section (428). As explained later, the transfer number and the priority order are counted for each of the advertisements owned by the member and each time the banner advertisement is clicked by the member, and are accumulated in the discrete member transfer number data accumulating section (428).

Then, the plurality of candidate banner advertisements obtained in the operating step described above are queried to a click data record accumulating section (425) in which record data for banner advertisements clicked for each member are accumulated to check whether the candidate advertisements have been transferred to the member or not, and candidate advertisements not transferred are treated preferentially. When the accumulated record data indicates that all of the candidate advertisements were transferred in the past, the banner advertisement having the oldest transfer record may preferentially be selected.

After the banner advertisement to be transferred is decided (424), determination is made as to whether the number of banner advertisements is an appropriate one or not (429). When the number of selected banner advertisements matches a preset value, it is determined that the number is appropriate, and otherwise it is determined that the number is not appropriate. If any banner advertisement to be transferred is not selected and it is determined that the number is not appropriate, querying is carried out again (423). In this case, for instance, the conditions in querying to the discrete member's preference data accumulating section (426) are mitigated, and the operating sequence for deciding a banner advertisement or banner advertisements to be transferred is executed again (424).

When it is determined that the number of banner advertisements is an appropriate one, the banner advertisements are transferred (430) from the transfer server (420) to the member, and is accumulated in the banner advertisement accumulating section (412) for the client (410). In this step, a transfer signal sent to the client (410) is counted as one transfer, and the number of transfers is accumulated in the discrete member transfer number data accumulating section (428). Then at the client (410), the banner advertisements are displayed (413) in the main advertisement display section (212) on the display plate (210) according to the priority order decided (424) by the transfer server (420).

Figure 5:
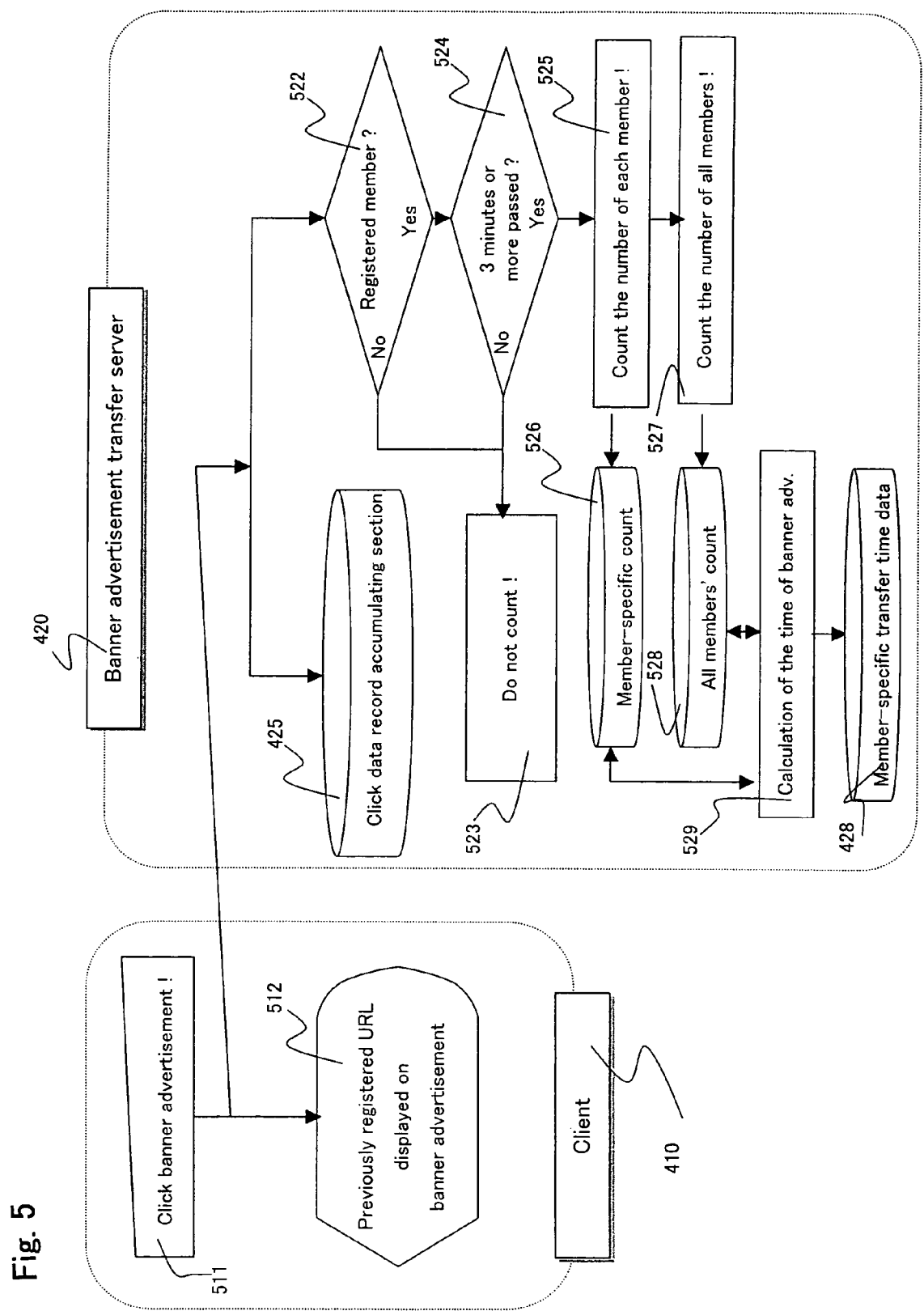
FIG. 5 is a flow chart for explaining the step for counting the numbers when a banner advertisement from each client is transferred.

Next, a method of counting the number of banner advertisement transfers provided by each member is described in the flow chart shown in FIG. 5. Also, in FIG. 5, like in FIG. 4, the client (410) is shown in the light side in the figure, and the transfer server (420) in the right side therein, respectively.

As described above, at the client (410), when the main advertisement display section (212) in the display plate (210) is clicked (511), a page (URL) prespecified on the display section (212) is displayed (512) on a browser screen (200) of the client (410), and during this step, transfer number for the banner advertisement provided by the member is counted in the transfer server (420).

Namely, in response to the clicking operation (511) described above, a signal with the information indicating which banner advertisement was selected (clicked), which member clicked the banner advertisement, or what time it was clicked, attached thereto is automatically transmitted by the program to the transfer server (420).

The transfer server (420) having received the signal fetches the information relating to the clicked member, clicked banner advertisement, and the time of clicking, accumulates the information in the click data record accumulating section (425), determines whether the signal was sent from the regular member or not (522), and terminates the counting work for the clicked number when it is determined that the signal is not from the registered member (523). On the other hand, when it is determined that the signal is from the registered member, the transfer server (420) measures the time passed from the time of clicking by the member just ahead (524), and determines whether a preset period of time (for instance, 3 minutes) has passed or not. When it is determined that the preset period of time has not passed, the clicking operation is regarded as that only for increase of clicks, and the counting work is not carried out (523). When it is determined that the present period of time has passed, the number of clicks for each member is counted (525), and the count is accumulated in a discrete member's count accumulating section (526). Further, the counts are summed up for all of the members (527), and the data is accumulated in an all members' count accumulating section (528).

The transfer number of a banner advertisement presented by each member is counted according to the number of clicking by the member for a banner advertisement presented by other members, and is generally counted with reference to the total count for a prespecified period of time (such as a month, a day, a week, a month, or the like) (529), but the scheme may be changed according to the necessity.

For instance, a transfer number exceeding the number of clicking by each discrete member or the total number of clicking by all members may be set by checking the counts in the discrete member's count accumulating section (526) and in the all members' count accumulating section (528) and calculating (529) the transfer number of the banner advertisement presented by the member from a ratio of the discrete member's count against the all members' count.

Further, the "transfer number of banner advertisement by each member" set according to the total count may be reduced or increased by calculating the sample standard deviation of a click number, for instance, for a week in the past to prevent stagnation of the click number due to passage of time or to eliminate the disadvantages of newly registered members as compared to the existing members.

The transfer number for the banner advertisement counted as described above is accumulated in the transfer number accumulating section (428) for each member or for each banner advertisement presented by each member.

With the present invention, a sponsor of a banner advertisement and a viewer of the banner advertisement stand at the completely same position, and therefore there is the clear motivation that "viewing is equal to being viewed", which contributes to acceptance of (or expect for) banner advertisements by the users and also to increase of the click number without demanding irrational efforts to the users.

(5) Effects of the Invention

With the present invention, the number of clicking on a banner advertisement can correctly be counted without requiring the count management considering ambiguous factors such as the usage time, and the transfer number of the banner advertisement is decided according to the total count, so that the feelings of inequality and unfairness never occur.

What is claimed is:

1. A non-transitory computer readable medium having tangibly stored thereon a computer executable program for implementing the steps comprising:

forming a predetermined registered group wherein each registered member of the predetermined registered group has a banner advertisement to be seen by other registered members of the predetermined registered group, transferring, first, banner advertisements from a server to the registered members of the predetermined registered group by requests of the registered members, analyzing click signals for each banner advertisement which is transferred to the registered member, counting the click signals by each of the registered members registered in the server, and total number of the click signals by all the registered members, deciding a ranking of each of the registered members in the group based on the click signals by each of the registered members with respect to the total number of the click signals by all the registered members in a predetermined time period, and transferring, second, a banner advertisement to other registered members based on said ranking of each of the registered members when receiving the requests by other registered members.

2. The non-transitory computer readable medium according to claim 1, wherein said click signal analyzing step analyzes and records the banner advertisement which was clicked, the member which clicked, and a time of the clicking.

3. The non-transitory computer readable medium according to claim 2, wherein said program measures a period of time having passed since a previous clicking by a member, and carries a counting work only when a preset period of time has passed since the previous clicking.

4. The non-transitory computer readable medium according to claim 1, wherein an analysis including data of the accumulated number of clicks on a registered banner advertisement, a ranking for the number of clicks, a number of accesses to a banner advertisement registered by a member, and ranking of the number of access is visually displayed in a user readable format in response to a manual operation.

5. The non-transitory computer readable medium according to claim 1, further comprising querying a banner advertisement to be transferred to each of the registered members, said querying step utilizing: a preference data accumulation step for accumulating preference data of each of the members, a banner advertisement accumulating step for storing the banner advertisements, and a transfer number data accumulating step, for storing the transfer number and priority order of each of the advertisements, the preference data accumulation step, the banner advertisement accumulating step and the transfer number data accumulation step being such that the transfer number and priority order are counted for each of the banner advertisements owned by each of the registered members, the banner advertisement passing the querying step being transferred to the registered member.

* * * * *